United States Patent [19]
Moriya

[11] Patent Number: 5,982,922
[45] Date of Patent: Nov. 9, 1999

[54] PATTERN INSPECTION APPARATUS AND METHOD

[75] Inventor: Kazuo Moriya, Ageo, Japan

[73] Assignee: Mitsui Mining & Smelting Co., Ltd., Tokyo, Japan

[21] Appl. No.: 08/794,391

[22] Filed: Feb. 6, 1997

[30]    Foreign Application Priority Data

Feb. 16, 1996  [JP]  Japan .................................... 8-052539

[51] Int. Cl.⁶ .................................................... G06K 9/00
[52] U.S. Cl. .......................... 382/149; 382/190; 348/126; 348/129
[58] Field of Search ..................................... 382/141, 190, 382/204, 144, 147, 149; 348/126, 129, 130; 364/468.17, 468.28; 356/385

[56]    References Cited

U.S. PATENT DOCUMENTS

| | | | |
|---|---|---|---|
| 4,509,075 | 4/1985 | Simms et al. ............................ | 348/129 |
| 4,776,023 | 10/1988 | Hamada et al. ......................... | 382/147 |
| 5,301,248 | 4/1994 | Takanori et al. ......................... | 348/126 |
| 5,408,538 | 4/1995 | Kitakado et al. ....................... | 348/126 |
| 5,453,699 | 9/1995 | Makishita et al. ...................... | 348/126 |
| 5,475,766 | 12/1995 | Tsuchiya et al. ........................ | 382/144 |
| 5,619,429 | 4/1997 | Aloni et al. ............................. | 382/141 |
| 5,748,320 | 5/1998 | Moriya .................................... | 356/385 |

Primary Examiner—Joseph Mancuso
Assistant Examiner—Gilberto Frederick, II
Attorney, Agent, or Firm—Kubovcik & Kubovcik

[57]         ABSTRACT

A pattern inspection apparatus includes a device for acquiring image data of a target inspection pattern, and an image processing unit for extracting a defect in the target inspection pattern on the basis of the image data and image data of a reference pattern. The image processing means performs image processing such that image data is prepared by reducing or increasing the pattern width of at least one of the pattern of a target inspection image represented by the image data of the target inspection pattern and the pattern of a reference image represented by the image data of the reference pattern to make the pattern width of the reference image smaller than that of the target inspection image, in this condition the target inspection image and the reference image are superposed and a portion where only the pattern of the reference image is present is extracted as a defect, image data is prepared by reducing or increasing the pattern width of at least one of the pattern of the target inspection image and the pattern of the reference image to make the pattern width of the reference image larger than that of the target inspection image, in this condition the target inspection image and the reference image are superposed and a portion where only the pattern of the target inspection image is present is extracted as a defect.

10 Claims, 8 Drawing Sheets

PATTERN INSPECTION APPARATUS AND METHOD

BACKGROUND OF THE INVENTION

1. Field of the Invention

The present invention relates to a pattern inspection apparatus and method adapted to inspect a pattern such as a wiring pattern on a TAB tape (tape carrier).

2. Prior Art

Conventionally, a pattern such as a wiring pattern on a TAB tape is inspected by comparing a target inspection pattern with a reference pattern.

In the conventional pattern inspection technique, however, optimized comparison logic for inspecting a pattern such as a wiring pattern on a TAB tape is not always established.

SUMMARY OF THE INVENTION

It is an object of the present invention to provide a pattern inspection apparatus and method based on optimized logic, which can easily inspect the presence/absence of a defect of a pattern such as a wiring pattern on a TAB tape.

In order to achieve the above object, according to the present invention, there is provided a pattern inspection apparatus comprising means for acquiring image data of a target inspection pattern, and image processing means for extracting a defect in the target inspection pattern on the basis of the image data and image data of a reference pattern, wherein the image processing means performs image processing such that image data is prepared by reducing or increasing the pattern width of at least one of a pattern of a target inspection image represented by the image data of the target inspection pattern and a pattern of a reference image represented by the image data of the reference pattern to make the pattern width of the reference image smaller than that of the target inspection image, and in this condition the target inspection image and the reference image are superposed and a portion where only the pattern of the reference image is present is extracted as a defect, or the image processing means performs image processing such that image data is prepared by reducing or increasing the pattern width of at least one of the pattern of the target inspection image and the pattern of the reference image to make the pattern width of the reference image larger than that of the target inspection image, and in this condition the target inspection image and the reference image are superposed and a portion where only the pattern of the target inspection image is present is extracted as a defect.

According to the present invention, there is also provided a pattern inspection method comprising the steps of preparing a pattern by reducing or increasing the pattern width of at least one of a target inspection pattern and a reference pattern to make the pattern width of the reference pattern smaller than that of the target inspection pattern, and in this condition superposing the target inspection pattern and the reference pattern and extracting as a defect a portion where only the reference pattern is present, or the steps of preparing a pattern by reducing or increasing the pattern width of at least one of the target inspection pattern and the reference pattern to make the pattern width of the reference pattern larger than that of the target inspection pattern, and in this condition superposing the target inspection pattern and the reference pattern and extracting as a defect a portion where only the pattern of the target inspection pattern is present.

The portion where only the pattern of the reference image (or reference pattern; the same applies to the following) is present is, e.g., a hole portion, a notched portion, or a disconnected portion of the target inspection pattern, and the portion where only the pattern of the target inspection image (or target inspection pattern) is present is a connected portion, a projecting portion, or a separated portion which is unnecessary for the target inspection pattern. The target inspection image in the state in which the pattern width of the reference image is smaller or larger than that of the target inspection image may be obtained by reducing the pattern width and then increasing the pattern width, or increasing the pattern width and then reducing the pattern width. The target inspection pattern is, e.g., a wiring pattern on a TAB tape.

The pattern width can be increased/reduced by, e.g., adding/removing a predetermined width to/from the contour of the pattern.

BRIEF DESCRIPTION OF THE DEAWINGS

DESCRIPTION OF THE PREFERRED EMBODIMENTS

Figure 1:
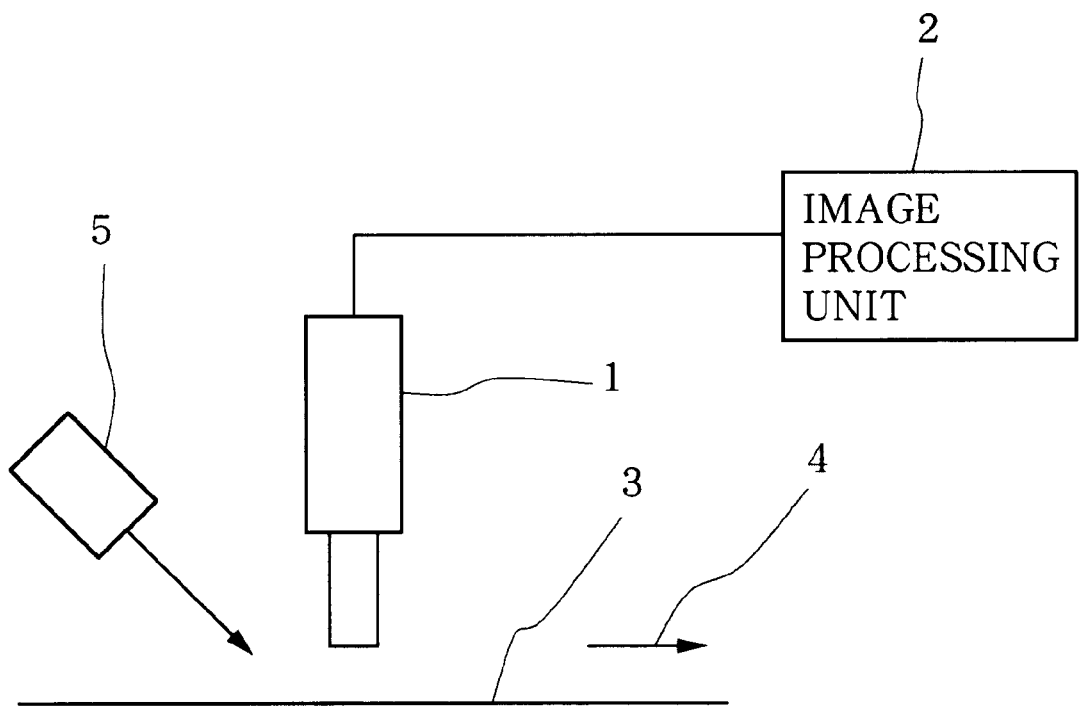
FIG. 1 is a schematic view showing a pattern inspection apparatus according to an embodiment of the present invention.

FIG. 1 is a schematic view showing a pattern inspection apparatus according to an embodiment of the present invention. This inspection apparatus comprises a TV camera 1 for acquiring the image data of a target inspection pattern, an image processing unit 2 for extracting a defect in the target inspection pattern on the basis of the acquired image data and the image data of a reference pattern, and an illumination unit 5 for illuminating the target inspection pattern. The target inspection pattern is a wiring pattern on a TAB tape 3 which is fed in a direction indicated by an arrow 4. The illumination unit 5 has an electronic shutter. The TV camera 1 can cope with the target inspection pattern at a traveling speed up to 66 mm/sec.

Inspection of the target inspection pattern is performed by synchronizing the timing of the arrival of each target inspection pattern on the TAB tape 3 at a predetermined position in the field of the TV camera 1, the shutter opening/closing timing of the illumination unit 5, and the timing of image data fetching of the image processing unit 2 through the TV camera 1 while feeding the TAB tape 3 in the direction indicated by the arrow 4 at a predetermined speed.

Figure 2:
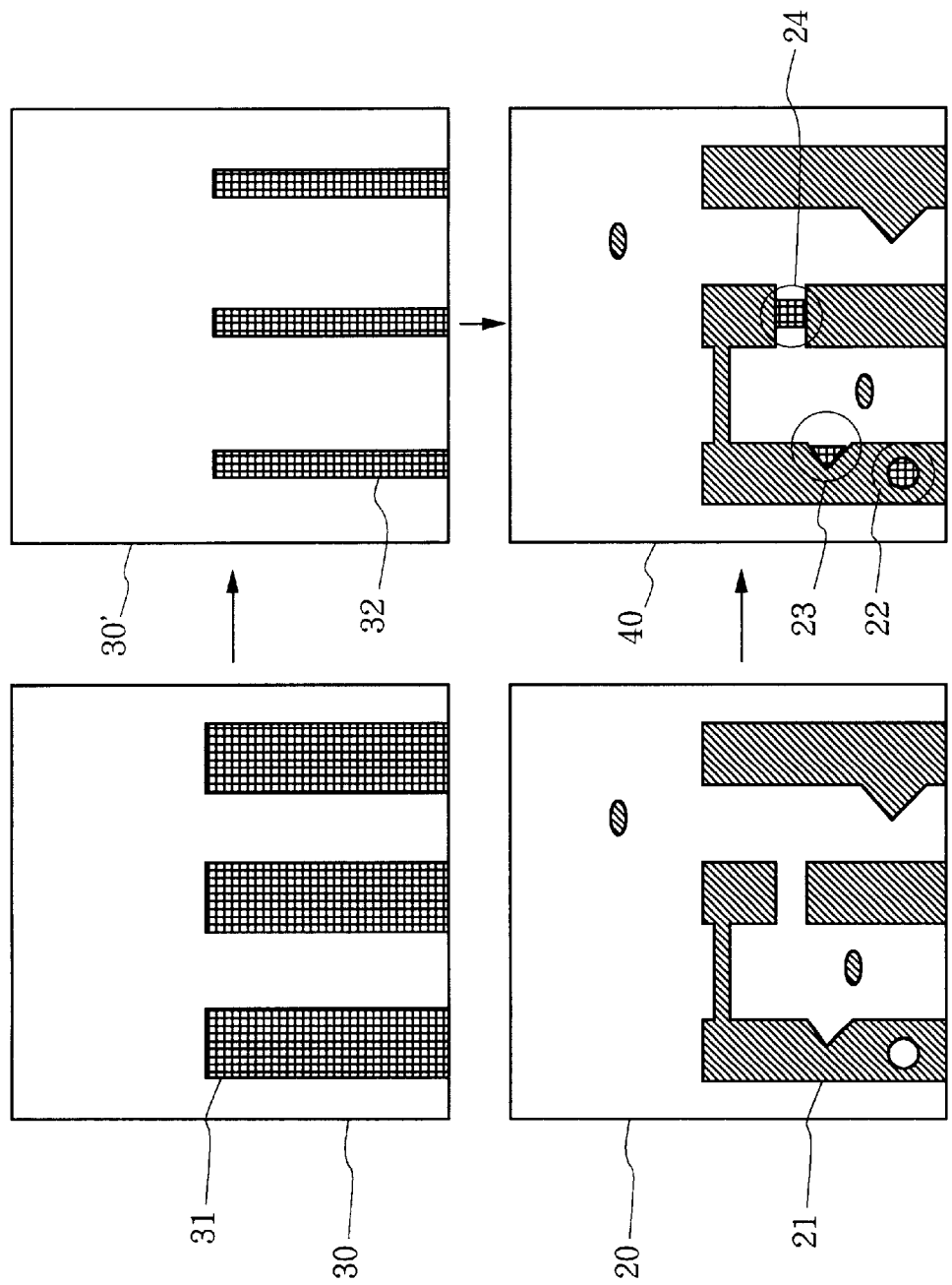
FIG. 2 is a view showing processing of the image processing unit of the apparatus shown in FIG. 1.
Figure 3:
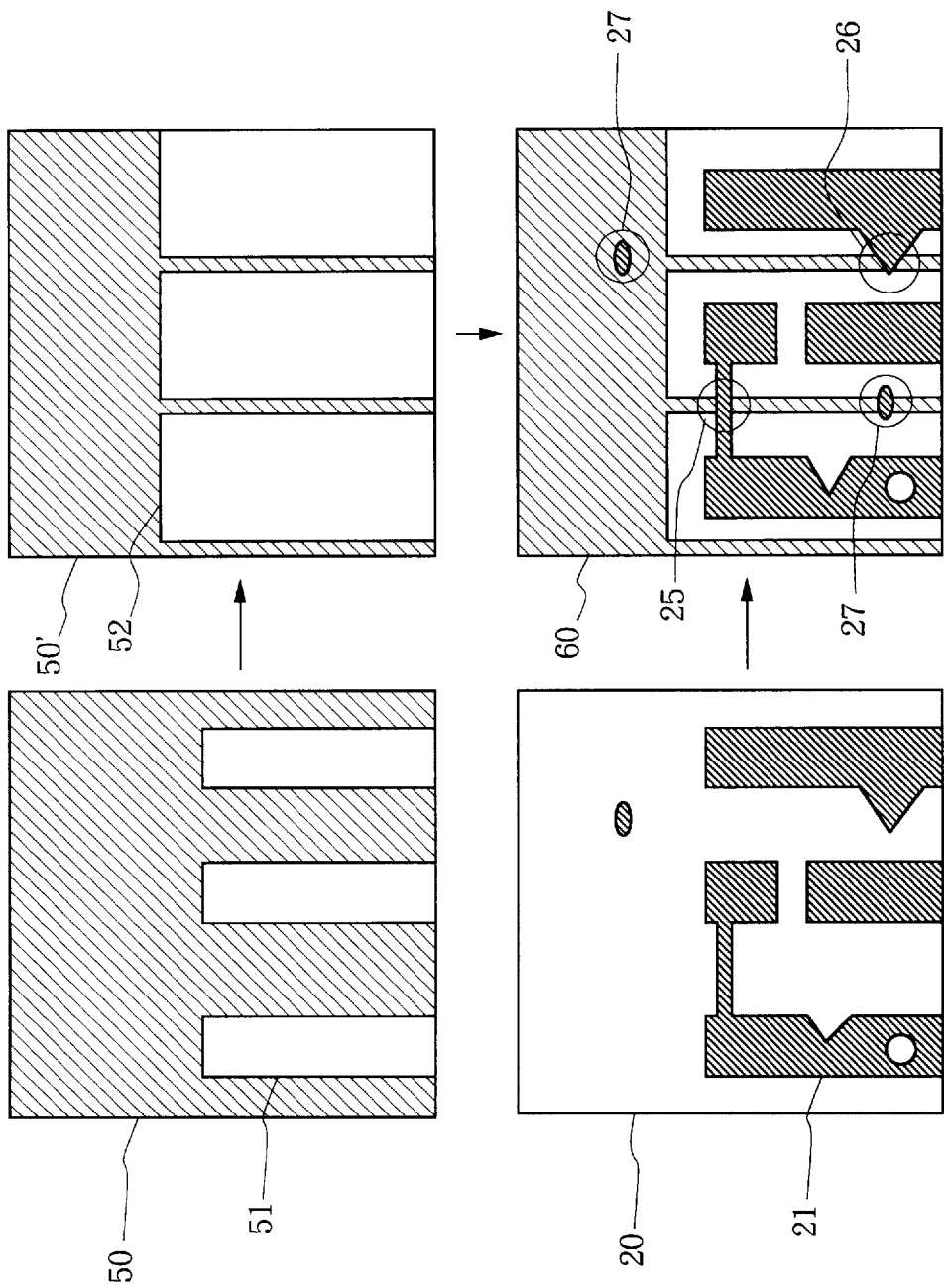
FIG. 3 is a view showing processing of the image processing unit of the apparatus shown in FIG. 1.

FIGS. 2 and 3 show processing of the image processing unit 2 for the image data of each target inspection pattern, which is fetched through the TV camera 1. As shown in FIG. 2, the image processing unit 2 extracting image data by reducing or increasing the pattern width of at least one of a pattern 21 of a target inspection image 20 represented by the image data of the target inspection pattern and a pattern 31 of a reference image 30 represented by the image data of a reference pattern to make the pattern width of the reference image smaller than that of the target inspection image. In this state, the target inspection image 20 and a reference image 30' are superposed to obtain an image 40. Portions 22, 23, and 24 where only the pattern 32 of the reference image 30' is present are extracted as defects. In this case, the width of the pattern 21 of the target inspection image 20 is not changed, and the pattern 32 having a width smaller than the width (35 µm) of the pattern 31 of the reference image 30 is prepared. The target inspection image 20 and the reference image 30' having the pattern 32 are superposed to obtain the image 40. With this processing, the portions where only the pattern 32 is present are extracted as the hole portion 22, the notched portion 23, and the disconnected portion 24 of the target inspection pattern.

To obtain the pattern 32 by reducing the width of the pattern 31, the pattern 31 may be reduced in size by a predetermined amount from its contour. As the image data of the images 30, 20, and 30', binary data can be used. Assume that the data of the patterns 32 and 21 are represented by "1", and the data of the remaining portion is represented by "0". In this case, the portion where only the pattern 32 is present in the image obtained by superposing the images 20 and 30' can be obtained as a data portion where the AND of the inverted data of the data of the image 20 and the data of the image 30' becomes "1".

As shown in FIG. 3, the image processing unit 2 prepares image data by reducing or increasing the pattern width of at least one of the pattern 21 of the target inspection image 20 and a pattern 51 of a reference image 50 to make the pattern width of the reference image larger than that of the target inspection image. In this state, the target inspection image 20 and a reference image 50' are superposed. Portions 25, 26, and 27 where only the pattern of the target inspection image is present are extracted as defects.

In this case, the width of the pattern 21 of the target inspection image 20 is not changed, and the image data 50' of a pattern 52 having a width larger than the width (35 µm) of the pattern 51 of the reference image 50 is prepared. The target inspection image 20 and the reference image 50' having the pattern 52 are superposed to obtain an image 60. With this processing, the portions where only the pattern 21 is present are extracted as the connected portion 25, the projecting portion 26, and the separated portion 27 which are unnecessary for the target inspection pattern.

To obtain the pattern 52 by increasing the width of the pattern 51, the pattern 51 may be increased in size by adding a predetermined amount of width to its contour. The data of the image 50' is binary data in which the data of the pattern 52 portion is represented by "0", and the background is represented by "1". The portion where only the pattern 21 is present in the image obtained by superposing the images 20 and 50' can be obtained as a data portion where the AND of the data of the image 20 and the data of the image 50' becomes "1".

When the pattern 21 portion of the image data of the target inspection patterns is represented by "0", and the remaining portion is represented by "1" because the TAB tape 3 is illuminated by the illumination unit 5 from the lower side with transmitted light, the data of the target inspection image is not inverted. The AND of the data of the target inspection image and the data of the image 30' is obtained. To obtain the AND of the data of the target inspection data and the data of the image 50', the inverted data of the target inspection image may be used.

Figure 4:
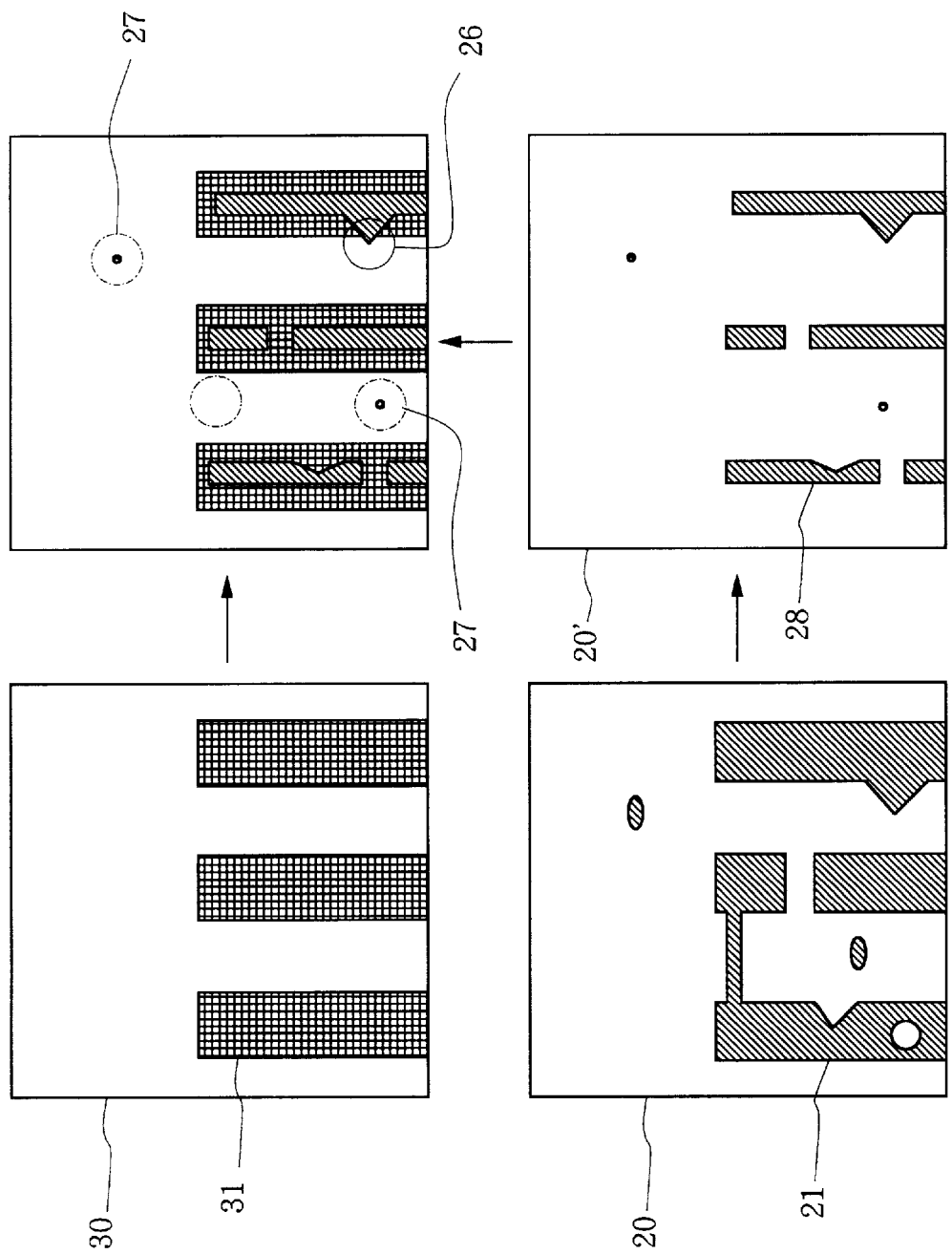
FIG. 4 is a view showing another processing form of the image processing unit of the apparatus shown in FIG. 1.
Figure 5:
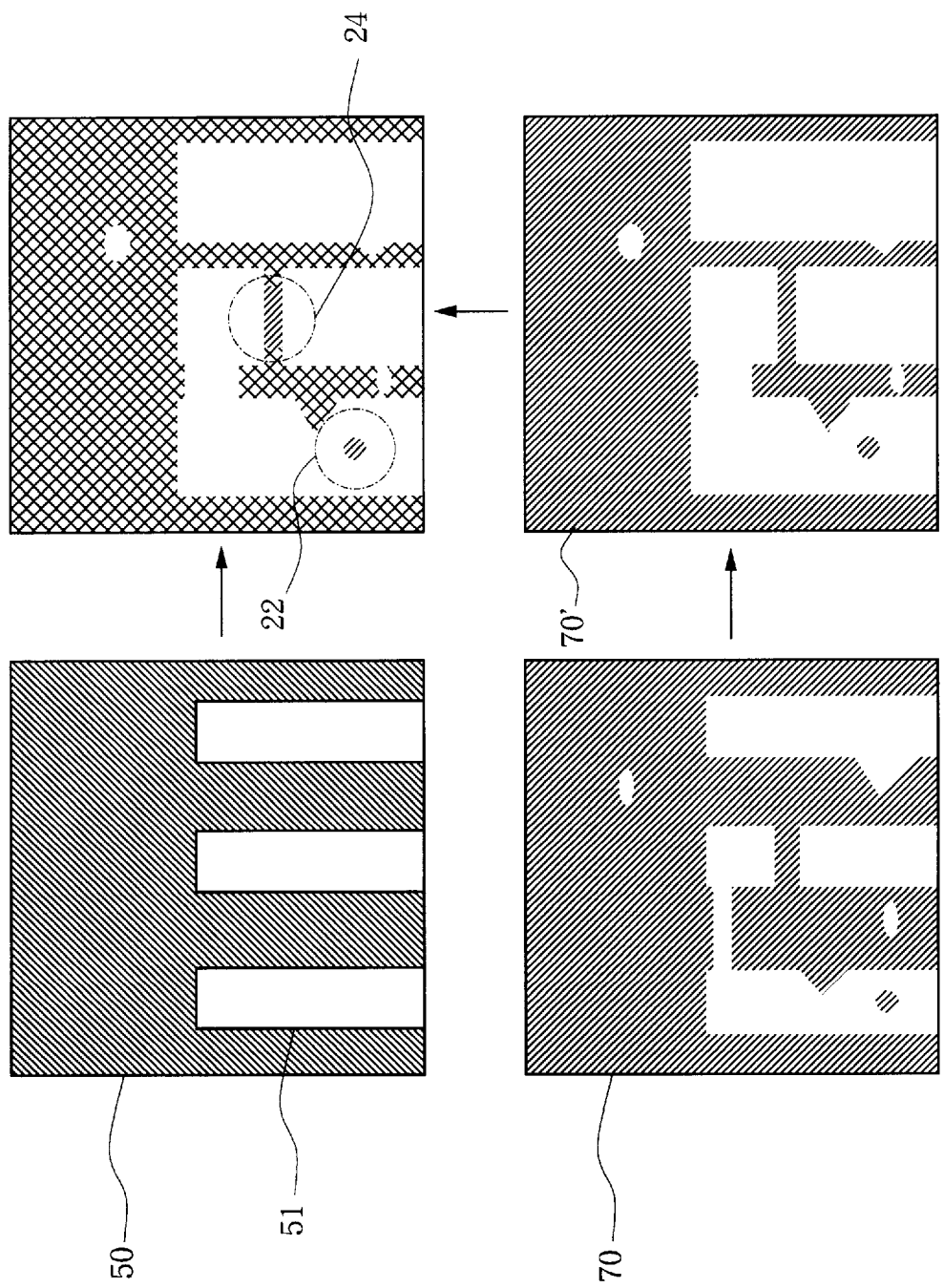
FIG. 5 is a view showing another processing form of the image processing unit of the apparatus shown in FIG. 1.

FIGS. 4 and 5 show another processing form of the image processing unit 2. In this case, as shown in FIG. 4, the reference image 30 is used without changing the pattern width. The target inspection image 20 is changed to a target inspection image 20' by reducing the width of the pattern 21 to form a pattern 28. The projecting portion 26 and the separated portion 27 where the AND of the inverted data of the reference image 30 and the data of the target inspection image 20' becomes "1" are extracted as defects. As shown in FIG. 5, by calculating the AND of the inverted data of the reference image 50, in which the pattern portion is represented by "0", and the background is represented by "1", and the data of an image 70' obtained by increasing the pattern width of a target inspection image 70 whose background is represented by "1", the hole portion 22 and the disconnected portion 24 are extracted.

Figure 6:
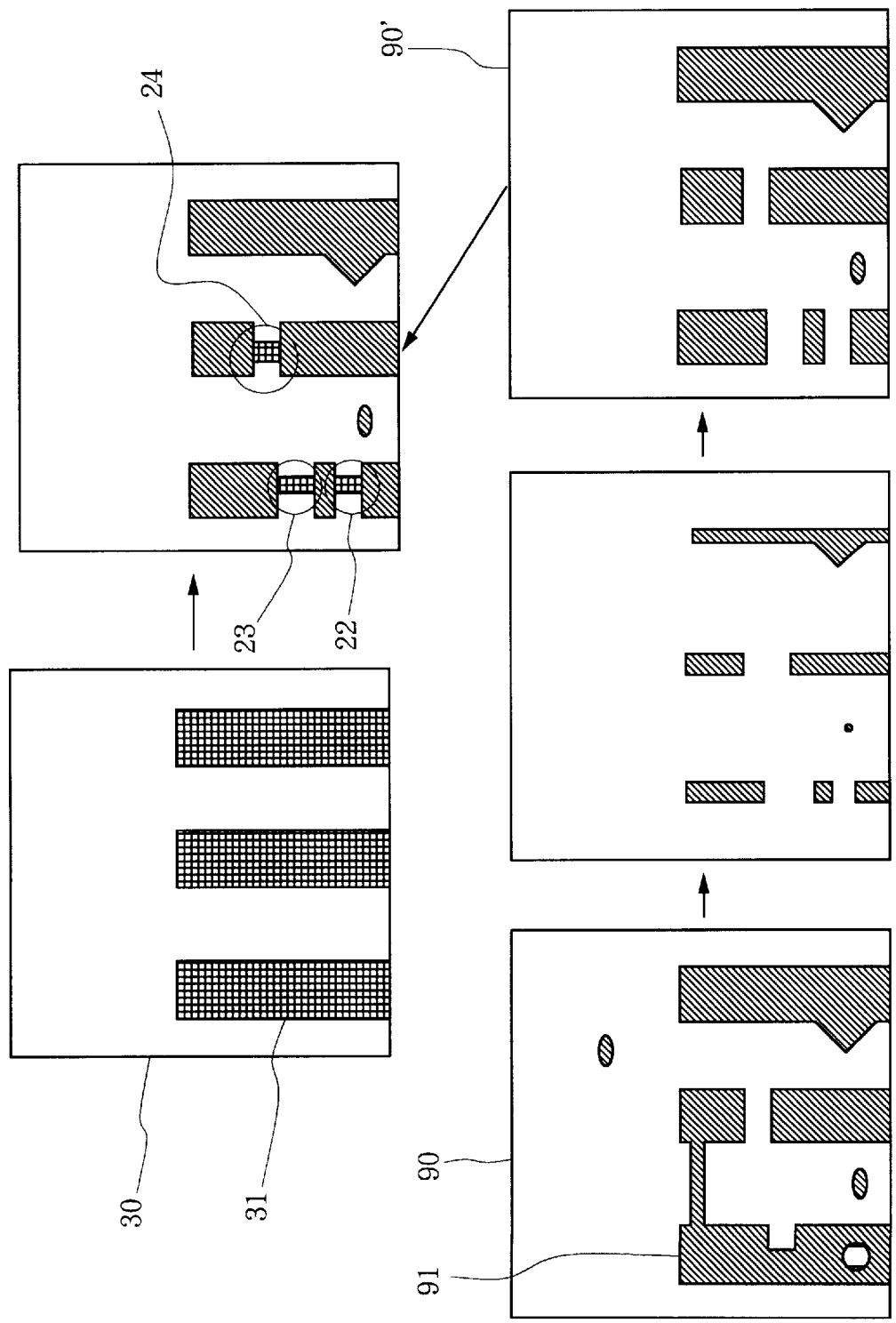
FIG. 6 is a view showing another processing form of the image processing unit of the apparatus shown in FIG. 1.
Figure 7:
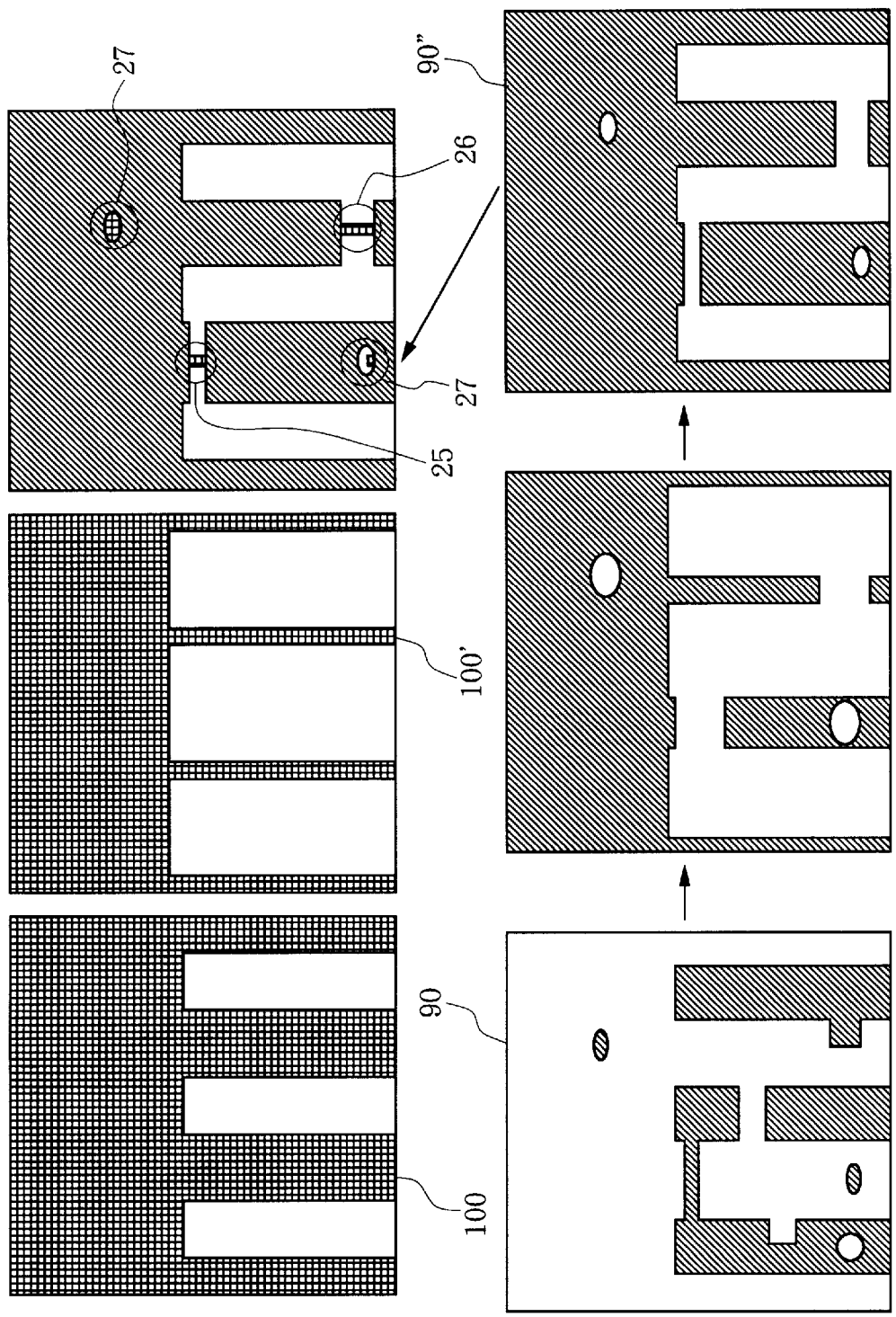
FIG. 7 is a view showing another processing form of the image processing unit of the apparatus shown in FIG. 1.

FIGS. 6 and 7 show still another processing form of the image processing unit 2. In this case, as shown in FIG. 6, the width of a pattern 91 of a target inspection image 90 is reduced and then increased, thereby obtaining an image 90'. By calculating the AND of the inverted data of the image 90' and the data of the reference image 30 having the pattern 31 with a reduced width, the hold portion 22, the notched portion 23, and the disconnected portion 24 of the target inspection pattern are extracted as defects. As shown in FIG. 7, the pattern width of the target inspection image 90 whose background is represented by "1" is increased and then reduced, thereby obtaining an image 90". In addition, the pattern width of an image 100 corresponding to the reference image 30 whose background is represented by "1" is increased, thereby obtaining an image 100'. By calculating the AND of the inverted data of the image 90" and the data of the image 100', the connected portion 25, the projecting portion 26, and the separated portion 27 which are unnecessary for the target inspection pattern are extracted as defects.

Figure 8:
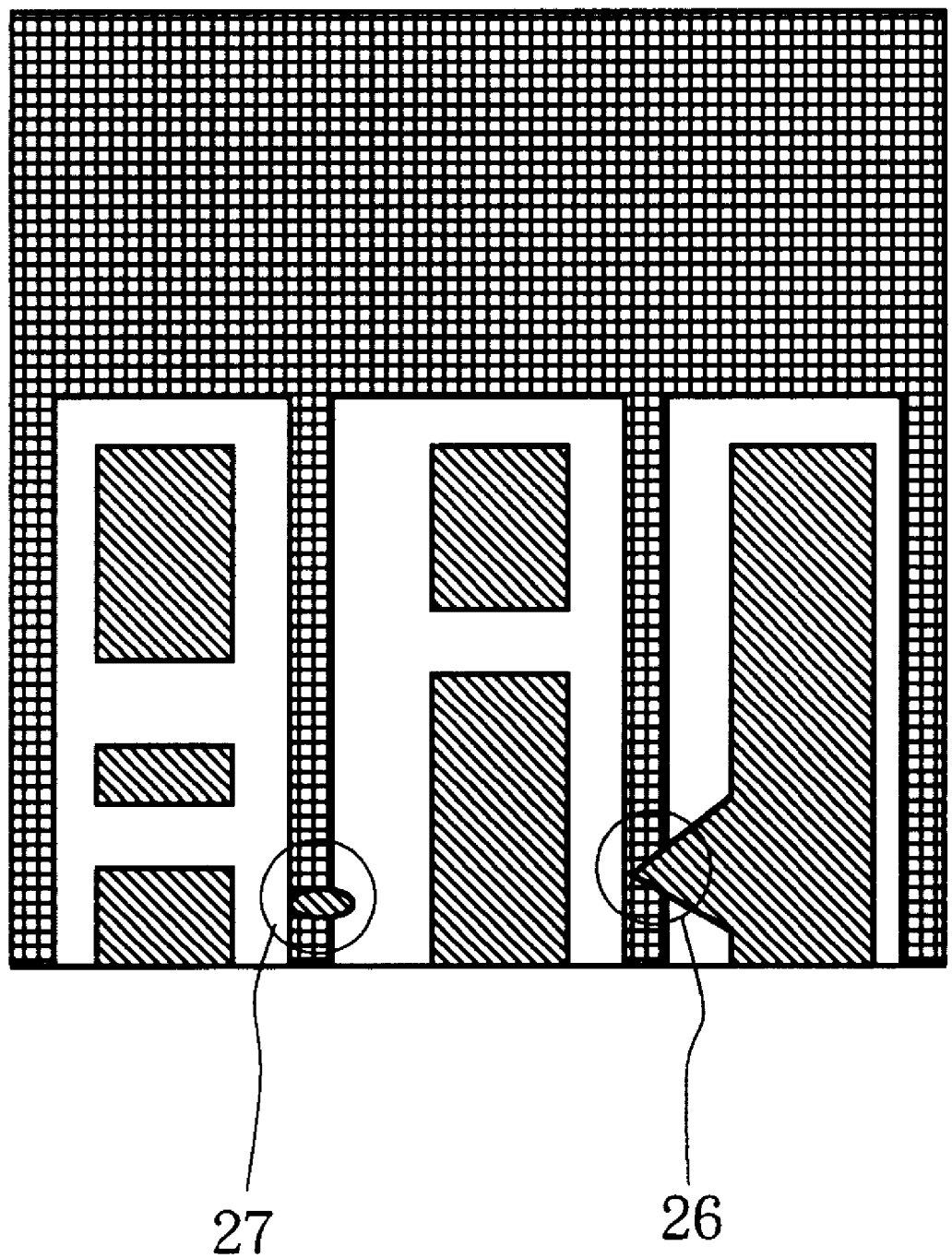
FIG. 8 is a view showing still another processing form of the image processing unit of the apparatus shown in FIG. 1.

When the AND of the images 90' and 100' is calculated, the projecting portion 26 and the separated portion 27 can be extracted, as shown in FIG. 8.

In this manner, when the pattern width of a target inspection image is reduced and then increased, or increased and then reduced, a defect portion is emphasized, so that the defect can be properly extracted.

As has been described above, according to the present invention, a pattern inspection apparatus and method based on optimized logic, which can easily inspect the presence/absence of a defect in a pattern, can be provided. In addition, these apparatus and method can easily cope with automatic pattern detection.

What is claimed is:

1. A pattern inspection apparatus for determining a defect in a target inspection pattern comprising:

means for acquiring image data of said target inspection pattern; and image processing means for extracting a defect in said target inspection pattern on the basis of the acquired image data and image data of a reference pattern, said reference pattern corresponding to a desired pattern, wherein said image processing means performs image processing such that image data is prepared by reducing or increasing the pattern width of at least one of the pattern of a target inspection image represented by the acquired image data of said target inspection pattern and the pattern of a reference image represented by the image data of said reference pattern to make the pattern width of the reference image smaller or larger than that of the target inspection image, and in this condition the target inspection image and the reference image are superposed and a portion where only said pattern of the reference image or said pattern of the target inspection image is present is extracted as a defect.

2. A pattern inspection apparatus for determining a defect in a target inspection pattern comprising:

means for acquiring image data of said target inspection pattern; and image processing means for extracting a defect in said target inspection pattern on the basis of the acquired image data and image data of a reference pattern, said reference pattern corresponding to a desired pattern, wherein said image processing means performs image processing such that image data is prepared by reducing or increasing the pattern width of at least one of the pattern of a target inspection image represented by the acquired image data of said target inspection pattern and the pattern of a reference image represented by the image data of said reference pattern to make the pattern width of the reference image smaller than that of the target inspection image, and in this condition the target inspection image and the reference image are superposed and a portion where only said pattern of the reference image is present is extracted as a defect, and image data is prepared by reducing or increasing the pattern width of at least one of said pattern of the target inspection image and said pattern of the reference image to make the pattern width of the reference image larger than that of the target inspection image, and in this condition the target inspection image and the reference image are superposed and a portion where only said pattern of the reference image is present is extracted as a defect.

3. An apparatus according to claim 1 or 2, wherein said portion where only said pattern of the reference image is present is corresponding to a hole portion, a notched portion, or a disconnected portion of said target inspection pattern, and said portion where only said pattern of the target inspection image is present is corresponding to a connected portion, a projecting portion, or a separated portion which is unnecessary for said target inspection pattern.

4. An apparatus according to claim 1 or 2, wherein the target inspection image in the state in which the pattern width of the reference image is smaller or larger than that of the target inspection image is obtained by reducing the pattern width and then increasing the pattern width, or increasing the pattern width and then reducing the pattern width.

5. An apparatus according to claim 1 or 2, wherein said target inspection pattern is a wiring pattern on a TAB tape.

6. A pattern inspection method, comprising the steps of:

preparing a pattern by reducing or increasing the pattern width of at least one of a target inspection pattern and a reference pattern, said reference pattern corresponding to a desired pattern, to make the pattern width of said reference pattern smaller or larger than that of said target inspection pattern; and in this condition superposing said target inspection pattern and said reference pattern and extracting, as a defect, a portion where only said reference pattern or said pattern of said target inspection pattern is present.

7. A pattern inspection method comprising the steps of:

preparing a pattern by reducing or increasing the pattern width of at least one of a target inspection pattern and a reference pattern, said reference pattern corresponding to a desired pattern, to make the pattern width of said reference pattern smaller than that of said target inspection pattern;

in this condition superposing said target inspection pattern and said reference pattern and extracting, as a defect, a portion where only said reference pattern is present;

preparing a pattern by reducing or increasing the pattern width of at least one of said target inspection pattern and said reference pattern to make the pattern width of said reference pattern larger than that of said target inspection pattern; and in this condition superposing said target inspection pattern and said reference pattern and extracting, as a defect, a portion where only said pattern of said target inspection pattern is present.

8. A method according to claim 6 or 7, wherein said portion where only said pattern of said reference pattern is present is a hole portion, a notched portion, or a disconnected portion of said target inspection pattern, and said portion where only said pattern of said target inspection pattern is present is a connected portion, a projecting portion, or a separated portion which is unnecessary for said target inspection pattern.

9. A method according to claim 6 or 7, wherein said target inspection pattern in the state in which the pattern width of the reference pattern is smaller or larger than that of the target inspection pattern is obtained by reducing the pattern width and then increasing the pattern width, or increasing the pattern width and then reducing the pattern width.

10. A method according to claim 6 or 7, wherein said target inspection pattern is a wiring pattern on a TAB tape.

* * * * *